No. 733,406. PATENTED JULY 14, 1903.
E. LIKEN.
FRICTION CLUTCH.
APPLICATION FILED JULY 3, 1902.
NO MODEL. 2 SHEETS—SHEET 1.

Ezra Liken, Inventor

Witnesses

No. 733,406. PATENTED JULY 14, 1903.
E. LIKEN.
FRICTION CLUTCH.
APPLICATION FILED JULY 3, 1902.
NO MODEL. 2 SHEETS—SHEET 2.
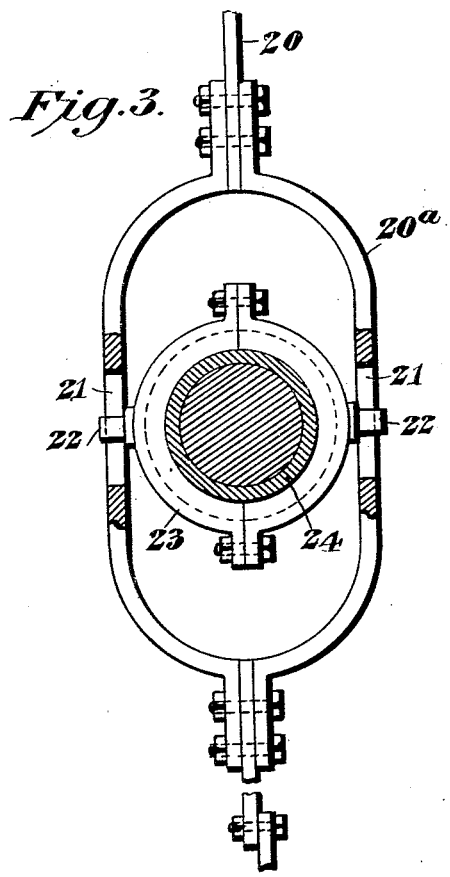
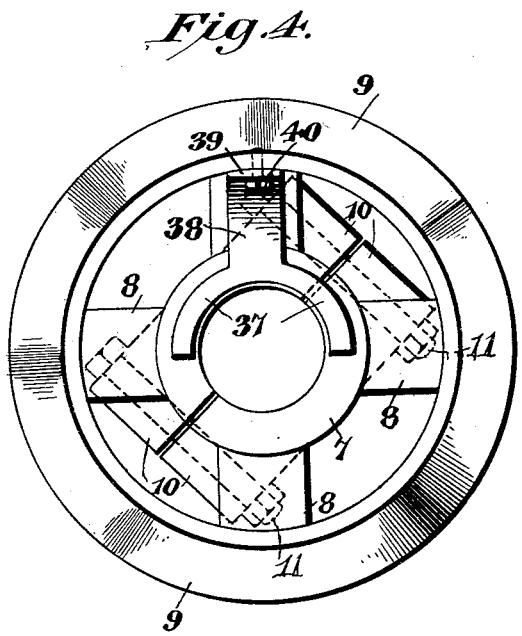
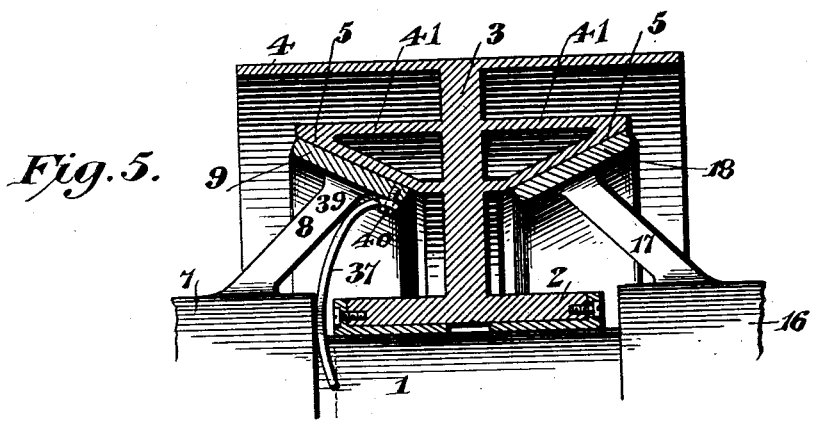
Ezra Liken, Inventor No. 733,406. Patented July 14, 1903.

UNITED STATES PATENT OFFICE.

EZRA LIKEN, OF BARKEYVILLE, PENNSYLVANIA.

FRICTION-CLUTCH.

SPECIFICATION forming part of Letters Patent No. 733,406, dated July 14, 1903.

Application filed July 3, 1902. Serial No. 114,216. (No model.)

*To all whom it may concern:*

Be it known that I, EZRA LIKEN, a citizen of the United States, residing at Barkeyville, in the county of Venango and State of Pennsylvania, have invented a new and useful Friction-Clutch, of which the following is a specification.

This invention relates to clutches, and is designed to provide an improved friction-clutch which may be readily set up either at an intermediate portion of a line-shaft or at the point of coupling between the fly-wheel or drive-disk of a gas-engine and a power-shaft, it being particularly designed to improve and simplify the construction shown in my former patent, No. 648,076, dated April 24, 1900.

It is furthermore designed to arrange the friction-surfaces of the device so that a standard size of clutch member may fit pulleys of different sizes, whereby all of the connecting parts between the friction member and the controlling-lever may be made in single standard sizes instead of requiring different sizes for the various sizes of pulleys.

Another object is to arrange for adjusting the connection between the controlling-lever and the movable clutch member for varying the throw of the latter and to have the adjusting element located so as not to interfere with and vary the throw of the controlling-lever.

Another object is to provide for automatically shifting the pulley out of engagement with the stationary clutch member when the movable clutch member is being drawn out of engagement with the pulley to insure a prompt disengagement of the pulley from the stationary clutch member.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
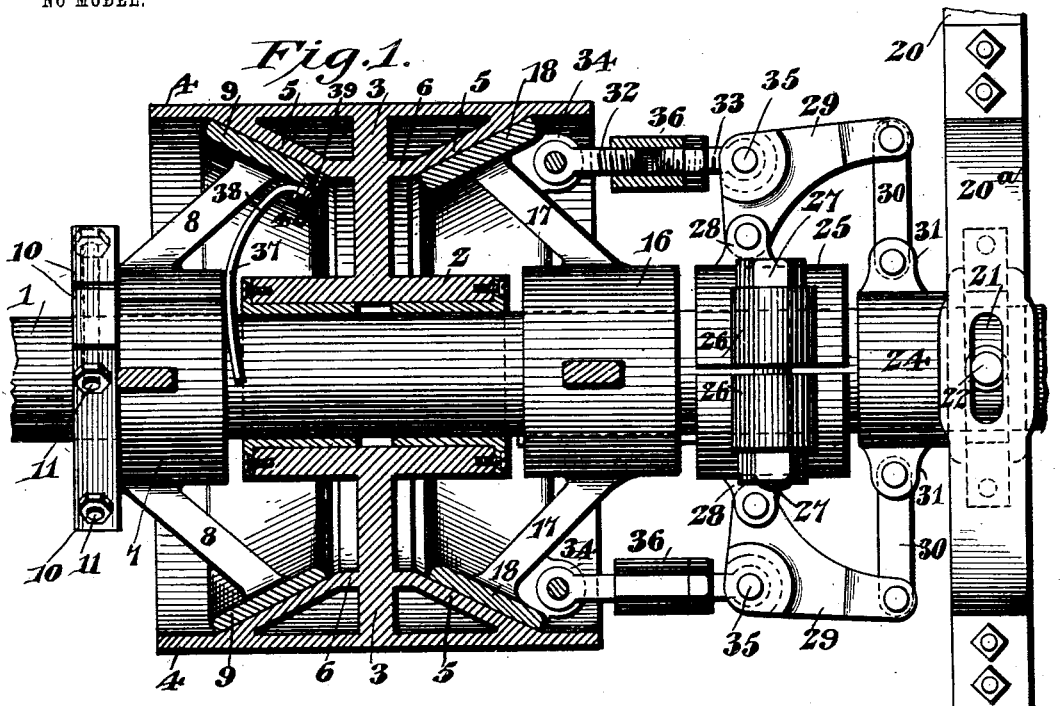
Figure 2:
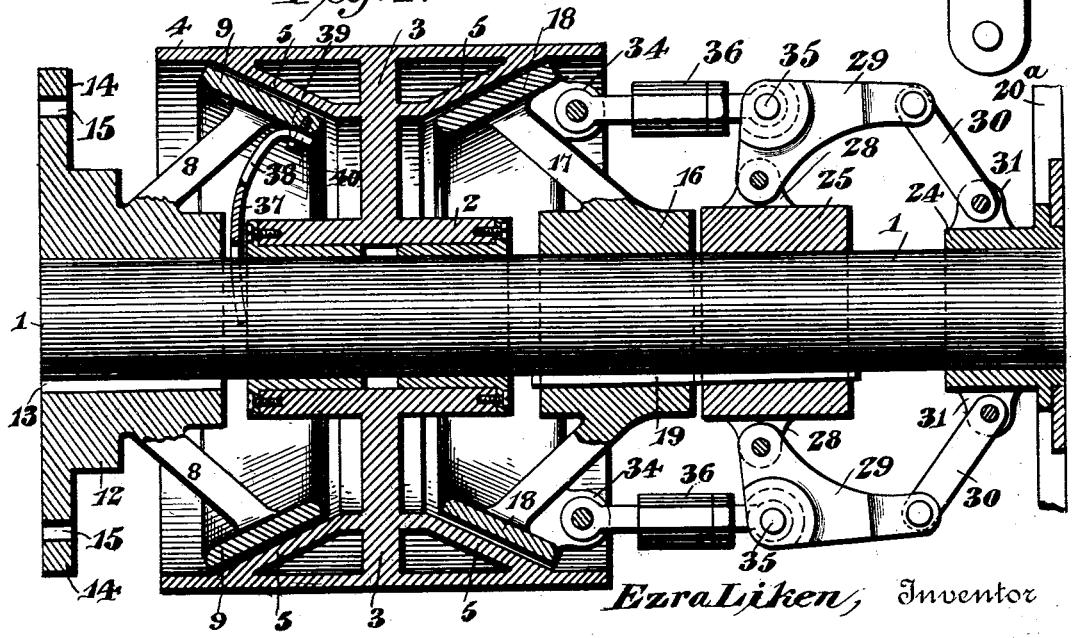

In the drawings, Figure 1 is a side elevation of a clutch mechanism constructed and arranged in accordance with the present invention, parts being broken away to show the frictional engagement between the clutch members and the pulley. Fig. 2 is a similar view with the clutch members out of engagement with the pulley and showing the form of the stationary clutch member for connection with the fly-wheel or drive-disk of a gas-engine. Fig. 3 is a detail sectional view showing the controlling-lever. Fig. 4 is an inner face view of a stationary clutch member and the spring for shifting the pulley out of engagement with said member. Fig. 5 is a detail sectional view illustrating how the standard size of clutch members coöperate with a pulley of greater diameter than that shown in Figs. 1 and 2.

Like characters of reference designate corresponding parts in all of the figures of the drawings.

Referring to the accompanying drawings, 1 designates a shaft upon which a loose pulley is mounted, said pulley being made up of a hub 2, spokes 3, and a rim 4, carried by the outer ends of the spokes, the opposite end portions of the pulley being open. It will of course be understood that this pulley is free to slide endwise upon the shaft as well as to rotate loosely thereon.

One of the important features of the present invention resides in the peculiar disposition of the friction surfaces or webs 5, which are located at opposite sides of the plane of the spokes, are carried thereby, and also inclined inwardly toward the same and also toward the longitudinal axis of the pulley. Instead of extending directly into the spokes the inner end of each web 5 is provided with an integral cylindrical flange 6, which is concentric with the pulley and also integral with the spokes; the outer end of each web also being integral with the rim of the pulley, as shown in Figs. 1 and 2. It is preferred to cast the hub, the spokes, the rim, the friction-webs, and the flanges integral, so as to form a strong and durable pulley, the space between the rim 4, the webs 5, and the spokes 3 being of course open, so as to save metal and also to lighten the pulley without weakening the same. Besides forming friction-surfaces the webs 5 serve to brace the rim of the pulley, and this is a very important feature, as the rim projects to a considerable extent at opposite sides of the spokes in order that the clutch members may work entirely within the pulley, as will be hereinafter explained.

One form of the stationary member of the clutch, as shown in Figs. 1 and 4, consists of a split hub 7, having arms 8, which are inclined outwardly toward and extend beyond the inner end of the hub and carry at their outer ends a tapered or conical rim or band 9, the outer surface of which is adapted to frictionally engage the adjacent web 5 of the loose pulley, so as to interlock the two members and also to limit the endwise movement of the pulley in one direction. This form of stationary clutch member is designed for application to an intermediate portion of a line-shaft, so as to form an abutment to limit endwise movement of a loose pulley, and as there is comparatively little strain upon the member it is not absolutely necessary that it be keyed to the shaft, and therefore it is designed to clamp the hub of the member upon the shaft by means of corresponding perforate ears 10 upon the opposite sections of the hub and at the outer end thereof, said ears being pierced by bolts 11, whereby the hub-sections may be drawn into snug engagement with the shaft, so as to connect the member thereto and to prevent endwise movement thereof. It will of course be understood that it is the hub only which is split, the rim 9 being continuous, so as to avoid joints therein.

In Fig. 2 the stationary clutch member is arranged to form a coupling between the fly-wheel or drive-disk of a gas-engine and the end of a shaft, the hub 12 being integral and rigidly connected to the shaft by means of a key 13, the outer end of the hub being provided with an integral disk or flange 14, having suitable bolt-openings 15 for the reception of bolts or other fastenings to engage with the fly-wheel or disk of an engine. It will be understood that the key 13 interlocks the clutch member and the shaft for simultaneous movement, while the connection between the member and the fly-wheel or drive-disk of the engine holds the member against endwise movement.

At the opposite side of the pulley is the movable clutch member, which consists of a hub 16, substantially radial arms 17, which are inclined outwardly and projected at the inner end of the hub, and a tapered or conical rim 18, carried by the outer ends of the arms and of a size to frictionally engage the adjacent web 5 of the pulley. The hub is connected to the shaft for simultaneous rotation therewith by means of a key 19, but is free to slide longitudinally thereof toward and away from the pulley in order that the rim 18 may be thrown into and out of engagement with the friction-web 5 of the pulley. For shifting the movable member in an endwise direction upon the shaft there is provided a lever 20, which is fulcrumed at one end upon a suitable support (not shown) independent of the shaft, and has an intermediate yoke portion 20$^a$, which straddles or embraces the shaft and is provided at opposite sides with corresponding longitudinal slots 21 for the slidable reception of pivot-pins or trunnions 22, carried by a collar 23, which is swiveled upon a sleeve 24, mounted to slide upon the shaft. The lever 20 and the sleeve 24 are located at the outer side of the movable clutch member, and between said member and the sleeve 24 is a stationary band 25, which is keyed to the shaft and preferably formed in half-sections, having corresponding perforate ears 26 for the reception of a bolt 27, whereby the band-sections may be snugly clamped upon the shaft, so as to hold the band against endwise movement. At diametrically opposite points upon the band are provided ears 28, to each of which is terminally pivoted a bell-crank or substantially L-shaped lever 29, the opposite end of which projects toward the controlling-lever 20 and is pivotally connected to the shiftable sleeve 24 through the medium of a link 30, having its opposite ends pivoted, respectively, to the free end of the lever 29 and to an ear 31 upon the sleeve 24. The connection between each lever 29 and the movable or shiftable clutch member is made up of two link members 32 and 33, of which the outer end of the member 32 is pivotally connected to a perforate ear 34 upon one of the arms 17 of the movable clutch member, while the outer end of the link member 33 is pivotally connected, as at 35, to the vertex of the angular lever 29. The inner ends of the link members are reversely screw-threaded and connected by means of a nut or turnbuckle 36, whereby the length of the link connection may be adjusted so as to accommodate the device to any and all circumstances.

The arrangement of the connection between the controlling-lever and the shiftable or movable clutch member is especially designed to improve the arrangement shown in my former patent, and in particular to have the shiftable clutch member separate from the stationary sleeve or band which forms the fulcrum-support of the angular lever, and also to have the adjustable connection between the angular lever and the shiftable clutch member, so that the latter may be adjusted with respect to the stationary sleeve or band and the relation between the controlling-lever and said sleeve or band may remain constant.

To throw the movable clutch member into engagement with the pulley, the controlling-lever is thrown toward the pulley, thereby shifting the sleeve 24 in the same direction and swinging the angular levers 29 toward the pulley, thereby forcing the clutch member toward and into engagement with the pulley through the medium of the link connection between the angular lever and the clutch member. A reverse movement of the controlling-lever will of course draw the movable clutch member out of engagement with the pulley, as shown in Fig. 2. When the movable clutch member is forced into engagement with the pulley, the latter is also shifted endwise upon the shaft until it is stopped by the stationary member, whereby the friction-webs 5 are snugly gripped between the tapered or conical rims of the clutch members and the pulley is effectually interlocked for simultaneous rotation with the shaft. It will here be observed that the clutch members work entirely within the pulley and are therefore housed and protected by the latter. The endwise movement of the shiftable clutch member is of course very slight, and all of the parts are arranged in compact order, so as to take up comparatively little space.

A very important feature of the present invention resides in providing for automatically shifting the pulley out of engagement with the stationary clutch member when the movable clutch member has been or is being moved out of engagement with the pulley in order that the latter may not stick or hang upon the stationary member. To accomplish this result, there is provided a yoke-shaped or U-shaped spring 37, which straddles the shaft between the hubs of the pulley and the stationary clutch member and is carried by the latter member. This yoke-shaped spring is provided with a shank or other stem portion 38, which has its end bent or extended laterally, as at 39, and connected to the inner side of the rim 9 of the member by means of a suitable fastening 40. It will of course be understood that the spring normally lies out of contact with the hub of the stationary clutch member and is therefore slightly displaced when the pulley is shifted into engagement with the stationary member, whereby tension is placed upon the spring. Just as soon as the movable clutch member is shifted out of engagement with the pulley the latter is automatically shifted out of engagement with the stationary clutch member by reason of the tendency of the spring to resume its normal position, the two different positions of the spring being clearly indicated in Figs. 1 and 2 of the drawings. As the spring is carried by the stationary clutch member it rotates simultaneously with said member, the shaft, and the pulley, and therefore there is no friction between the spring and these parts.

The peculiar disposition of the inclined friction surfaces or webs 5 within the pulley is a very important feature of the present invention, as these friction-webs are effectually braced by the spokes and the rim of the pulley of the spokes take some of the pressure, and the rim is considerably relieved of pressure, which is an important advantage over my former patent and similar devices, as in such devices all of the strain comes entirely upon the rim of the pulley. Moreover, by having the friction-webs connected to or carried by the spokes they may always be located at a predetermined distance from the axis of the pulley, whereby the position of the friction-webs is not dependent upon the size or diameter of the pulley, and therefore each clutch member may be of a standard size and applicable to pulleys of different sizes, as clearly indicated in Fig. 5 of the drawings. In this figure the friction-webs 5 are shown at the same distance from the axis of the pulley as they are in Figs. 1 and 2, and instead of being connected to the rim 4 they are terminated short of the rim, with their outer ends connected to the spokes by means of the respective cylindrical flanges 41, which serve to brace the webs in the same manner as the rim in Figs. 1 and 2. It will here be observed that in each form of pulley the hub is terminated short of the outer ends of the rim in order that the clutch members may effectively work within the rim, and the gripping-surfaces are arranged close to the center of the pulley and also comparatively near the shaft, so as to secure the most effective operation of the clutch members upon the pulley.

What I claim is—

1. In a friction-clutch, a rotatable member having spokes, a rim and a substantially conical friction-web in addition to the rim and inclined inwardly toward the spokes with its opposite ends connected thereto.

2. In a friction-clutch, a rotatable member having spokes, inner and outer cylindrical flanges carried by the spokes, and a substantially conical friction-web connected to the flanges.

3. In a friction-clutch, a rotatable member having spokes, inner and outer flanges, of which the outer flange is wider than the inner flange and forms the rim, and a friction-web carried by and flared outwardly from the inner flange and connected at its opposite ends with the rim and the spokes.

4. A loose pulley, comprising a hub, spokes, a rim, and a substantially conical friction-web in addition to the rim with its opposite ends connected to the spokes.

5. A loose pulley embodying a hub, inner and outer cylindrical flanges carried by and projected at opposite sides of the spokes, the outer flange forming the rim, and substantially conical friction-webs located at opposite sides of the spokes, each web being inclined inwardly toward the spokes and the hub of the pulley with its opposite ends connected to the rim and the spokes.

6. In a friction-clutch, the combination with a rotatable shaft, of a loose pulley mounted thereon and having spokes, inner and outer cylindrical flanges carried by and projected at opposite sides of the spokes, and substantially conical friction-webs disposed at opposite sides of the spokes, each web having its opposite ends connected to the respective flanges and also inclined inwardly toward the spokes, and clutch members located at opposite sides of the pulley, one of the members being fixed and the other shiftable, each member embodying a hub embracing the shaft, substantially radial and inclined arms carried by the hub and projected beyond the inner end thereof, and a substantially conical rim carried by the outer ends of the arms and in coöperative relation with the adjacent conical friction-web of the pulley.

7. In a clutch, the combination with a shaft, and mutually coöperating clutch members mounted thereon, one of the members being shiftable into and out of engagement with the other, of means for moving the shiftable member comprising a split band having fastenings to clamp the same upon the shaft, a lever fulcrumed upon the split band, a link connection between the lever and the shiftable clutch member, and controlling means connected to the lever.

8. In a clutch, the combination with a shaft, and mutually coöperating clutch members mounted upon the shaft, one of the members being shiftable into and out of engagement with the other, of means for moving the shiftable member comprising a split band having fastenings to clamp the same upon the shaft, a lever fulcrumed upon the split band, a link connection between the lever and the shiftable clutch member, a sleeve slidable upon the shaft and having a link connection with the lever, and a controlling-lever fulcrumed independently of the shaft and connected to the sleeve for shifting the same.

9. In a clutch, the combination with a shaft, and mutually coöperating clutch members mounted thereon, one of the members being shiftable into and out of engagement with the other, of means for moving the shiftable member, the shiftable member being located between the other clutch member and the shifting means, said shifting means comprising a split band carried by the shaft outside and independent of the shiftable member, an angle-lever having one end fulcrumed upon the split band with its other end extending away from the shiftable member, a pair of links having a turnbuckle connection with their respective outer ends pivotally connected to the shiftable clutch member and the vertex of the lever, and means connected to the outer end of the lever for controlling the same.

10. In a clutch, the combination with a shaft, of a loose endwise-shiftable pulley, fixed and shiftable clutch members located at opposite sides of the pulley, and a yoke-shaped spring straddling the shaft and carried by the stationary clutch member to automatically shift the pulley out of engagement with the stationary clutch member when the shiftable clutch member is disengaged therefrom.

11. In a clutch, the combination with a shaft, a loose endwise-shiftable pulley having friction-surfaces at opposite sides of the spokes thereof, stationary and shiftable clutch members mounted upon the shaft at opposite sides of the pulley, each member comprising a hub, arms projected therefrom, and a rim carried by the arms and in coöperative relation with the adjacent friction-surface of the pulley, of a yoke-shaped spring straddling the shaft between the hubs of the pulley and the stationary clutch member and provided with a shank or stem connected to the inner side of the rim of the stationary clutch member, the spring being in the path of the shiftable movement of the hub of the pulley toward the stationary clutch member to shift the pulley out of engagement with the stationary member when the shiftable clutch member is disengaged therefrom.

In testimony that I claim the foregoing as my own I have hereto affixed my signature in the presence of two witnesses.

EZRA LIKEN.

Witnesses:
C. D. JAMES,
W. S. MORRIS.